(12) United States Patent
Pratt

(10) Patent No.: US 7,304,255 B1
(45) Date of Patent: Dec. 4, 2007

(54) VEHICLE ELECTRICAL CONTROL SYSTEM FOR OVERRIDING AN EXISTING VEHICLE FUSE BOX

(76) Inventor: Philip G. Pratt, 1666 Cadillac, Windsor, On (CA) N8Y 2V5

( * ) Notice: Subject to any disclaimer, the term of this patent is extended or adjusted under 35 U.S.C. 154(b) by 0 days.

(21) Appl. No.: 11/654,839

(22) Filed: Jan. 18, 2007

(51) Int. Cl.
*H01R 24/00* (2006.01)

(52) U.S. Cl. .............. 200/51 R; 200/51.02; 200/51.05; 362/485; 439/622; 340/457

(58) Field of Classification Search .............. 200/51 R, 200/51.02–51.11, 52 R; 362/485, 394, 540; 439/622, 717, 949; 340/457, 547, 540, 545
See application file for complete search history.

(56) References Cited

U.S. PATENT DOCUMENTS

| | | | |
|---|---|---|---|
| 5,019,676 A | 5/1991 | Heckenkamp | |
| 5,041,704 A * | 8/1991 | Stenz et al. .................. | 200/6 R |
| 5,276,284 A | 1/1994 | Carpenter | |
| 5,602,526 A | 2/1997 | Read | |
| 5,915,978 A | 6/1999 | Hayakawa et al. | |
| 6,000,822 A | 12/1999 | Polizzi et al. | |
| 6,011,321 A * | 1/2000 | Stancu et al. .............. | 307/10.5 |
| 6,078,160 A * | 6/2000 | Cilluffo ....................... | 318/641 |
| 6,417,579 B1 * | 7/2002 | Lehnst et al. .............. | 307/10.7 |
| 6,608,264 B1 * | 8/2003 | Fouladpour .............. | 200/51.03 |
| 6,661,349 B1 | 12/2003 | Kuruvilla et al. | |
| 6,783,267 B1 | 8/2004 | Yeoman | |
| 6,878,889 B1 * | 4/2005 | Horst et al. .............. | 200/51.11 |

* cited by examiner

*Primary Examiner*—K. Richard Lee
(74) *Attorney, Agent, or Firm*—Robert C. Montgomery

(57) ABSTRACT

The present invention includes an electrical adapter switch assembly for bypassing the door light circuit on a Jeep TJ® when the driver and/or passenger door is removed. The defeat switch is a plug in electrical adapter designed to bypass the door light circuit on a Jeep TJ® when either or both front vehicle doors are removed. In use, the adapter is inserted in place of the existing door fuse. A slider switch mounted on the cover of the adapter is placed in an On/Normal position where the door light circuits function in the normal manner. Conversely, when placed in an Off/Remote position, the fuse is effectively removed from the circuit and the door lights will not operate even if the vehicle doors are removed. A remote plug allows for a remote mounted switch, perhaps located on the dashboard to be wired in to control the door light circuits.

17 Claims, 3 Drawing Sheets

VEHICLE ELECTRICAL CONTROL SYSTEM FOR OVERRIDING AN EXISTING VEHICLE FUSE BOX

RELATED APPLICATIONS

The present invention was first described in Disclosure Document No. 585,113 filed on Aug. 30, 2005.

FIELD OF THE INVENTION

This invention relates to vehicle fuse box deactivating systems and, more particularly, to a vehicle fuse box deactivating system for enabling an operator to selectively bypass at least one vehicle function enabled by an existing vehicle fuse box while at least one door of the vehicle is detached therefrom.

BACKGROUND OF THE INVENTION

With sales at an all-time high, the popularity of the Jeep TJ® as an everyday vehicle is more wide spread than it ever has been. Their utility and convenience in hauling items coupled with the ability of the vehicle to get into and out of off road locations have made them a popular alternative to other vehicles. Another attractive feature of the vehicle is the ability to remove the driver's and passenger's door for real off-roading adventures or for summertime driving. However, when the doors are removed, the interior vehicle lights remain on at all times due to the door switches being activated. This forces the user to remove the fuse from the vehicle fuse box to disable the lights. While this method works, it is very inconvenient, and places repeated stress and strain on the vehicle fuse box over time. Accordingly, the need has arisen for a means that permits the easy and rapid disabling of interior lights on a Jeep TJ® when the doors are removed. The development of the present invention fulfills this need.

Several attempts have been made in the past to develop a vehicle fuse box deactivating system for enabling an operator to selectively bypass at least one vehicle function enabled by an existing vehicle fuse box while at least one door of the vehicle is detached therefrom. U.S. Pat. No. 6,783,267 in the name of Yeoman, et al discloses a light fixture with a light that is electrically controlled by a magnetic switch positioned about the juncture between a door or movable cap and the frame such that the light may be switched on when the door or cap is away from the frame and the light may be switched off when the door or cap is closed next to the frame. Unfortunately, this prior art example does not allow a user to remove the doors of a vehicle and at the same time prevent the vehicle lighting circuit from being activated.

U.S. Pat. No. 5,915,978 in the name of Hayakawa, et al discloses a junction box whose total size is reduced without reducing the areas necessary for accommodating fuse receptacles and relay receptacles. The body of the junction box is preferably a flat rectangular parallelepiped. On the first face thereof, there are integral relay receptacles, preferably adjacent one side in a single vertical row. On the opposite face, there is a plurality of fuse receptacles located adjacent the opposite side of the junction box and thereby spaced apart laterally from the relay receptacles. Those fuses which are relatively near to the relay receptacles are for apparatus which is not operated continuously, such as a rear windshield wiper, cigarette lighter, etc. On the four sides of the body are provided the locking members with which the junction box is fixed to the base, usually the chassis of an automotive vehicle. Unfortunately, this prior art example does not provide a means of attaching a switch that allows a user to selectively activate and deactivate the fuse(s) necessary to respectively activate and deactivate a vehicle lighting system when the vehicle doors are removed.

U.S. Pat. No. 5,602,526 in the name of Read describes an open door warning system for a vehicle that includes an open door detector mounted on the vehicle, which detects when the door is left open, and a light module mounted on a side of the vehicle and operatively coupled to the detector. The light module is preferably aligned with a driver side rear view mirror so that the driver can view the light module through the rear view mirror. The light module includes a light source which is driven by the detector to generate a flashing warning light when the door is left open. This warning light can be seen by the driver through the rear view mirror and thereby be warned of the open door situation. The detector includes a magnetically actuated switch controlled by a magnet attached to a top edge of the door. The switch is mounted on the vehicle to be juxtaposed to the magnet when the door is closed. The switch is coupled to a power module which includes a light driver circuit, a rechargeable battery pack, and a solar cell to keep the battery pack charged. The light driver circuit is coupled to the light module to transmit a warning signal thereto, which in turn causes the light module to flash. Unfortunately, this prior art example warns a driver of an open door, but also does not provide a means whereby a user can selectively activate and deactivate a vehicle lighting system when the doors are removed from the vehicle.

U.S. Pat. No. 6,000,822 in the name of Polizzi, et al discloses an apparatus mounted to a vehicle door that has a pull strap by which the occupant may pull the door closed. A lamp is mounted on the door at a position generally outboard and concealed behind the pull strap. The pull strap is vertically located in relation to the occupant and the lap in a position so that light emanating from the lamp is directed onto the occupant lamp for reading when the door is closed and, simultaneously, shielded from shining into the occupant's eyes by the pull strap. When the door is swung open, the light shines down on the roadway. Unfortunately, this prior art example provides lighting to an occupant via an attached door, and does not allow a user to selectively activate and deactivate a vehicle lighting system while the doors are removed via a switch attached to an existing vehicle fuse box.

None of the prior art particularly describes a vehicle fuse box deactivating system for enabling an operator to selectively bypass at least one vehicle function enabled by an existing vehicle fuse box while at least one door of the vehicle is detached therefrom. Accordingly, there is a need for a device which provides such features while overcoming the above-noted shortcomings.

SUMMARY OF THE INVENTION

In view of the foregoing disadvantages inherent in the prior art, it has been observed that there is need for a vehicle fuse box deactivating system for enabling an operator to selectively bypass at least one vehicle function enabled by an existing vehicle fuse box while at least one door of the vehicle is detached therefrom.

The system includes a portable enclosure removably coupled to the existing vehicle fuse box. Such an enclosure has a generally square shape provided with approximately a 1.5 inch width and one inch thickness for allowing the enclosure to fit within space limited areas of the existing fuse box. Of course, such an enclosure can be produced in a variety of shapes and sizes, as is obvious to a person of ordinary skill in the art.

The system further includes a mechanism for toggling a plurality of electrically actuated circuits between operating and non-operating modes while at least one vehicle door is detached from the vehicle. Such a circuit toggling mechanism is advantageously housed within the enclosure and further is electrically coupled to the existing vehicle fuse box. Such an existing vehicle fuse box is electrically connected to the electrically actuated circuits when the circuit toggling mechanism is adapted to an on position, which is essential such that at least one of the electrically actuated circuits remains functional when the at least one vehicle door is detached from the vehicle. The existing vehicle fuse box is electrically disconnected from the electrically actuated circuits when the circuit toggling mechanism is adapted to an off position, which is critical such that at least one of the electrically actuated circuits remains non-functional when the at least one vehicle door is detached from the vehicle.

The circuit toggling mechanism includes a fuse connection plug electrically coupled to the existing vehicle fuse box, and a local bypass switch operably coupled to the fuse connection plug. Of course, such a fuse connection plug can be produced in a variety of shapes and sizes, as is obvious to a person of ordinary skill in the art. A remote switch jack carries an electrical current to the at least one electrically actuated circuits. Such a circuit toggling mechanism further includes a main fuse electrically connected directly to the main fuse plug, without the use of intervening elements, and an internal overcurrent protective device electrically coupled to the fuse connection plug and the remote switch jack, which is crucial for protecting the circuit toggling mechanism from overcurrent conditions caused by the main fuse. Such an internal overcurrent protective device includes at least one component selected from the group including a fuse and a circuit breaker respectively.

The local bypass switch is electrically wired in series with the fuse connection plug and the main fuse and the internal overcurrent protective device respectively, which is vital for bypassing both the main fuse and the internal overcurrent protective device when the local bypass switch is toggled to the off position. A remote switch is electrically wired in parallel to the local bypass switch. Such a remote switch is in direct electrical communication, without the use of intervening elements, to the remote switch jack, which is important such that the vehicle electrical control system is selectively adaptable between active and inactive modes while the local bypass switch remains in the open position.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
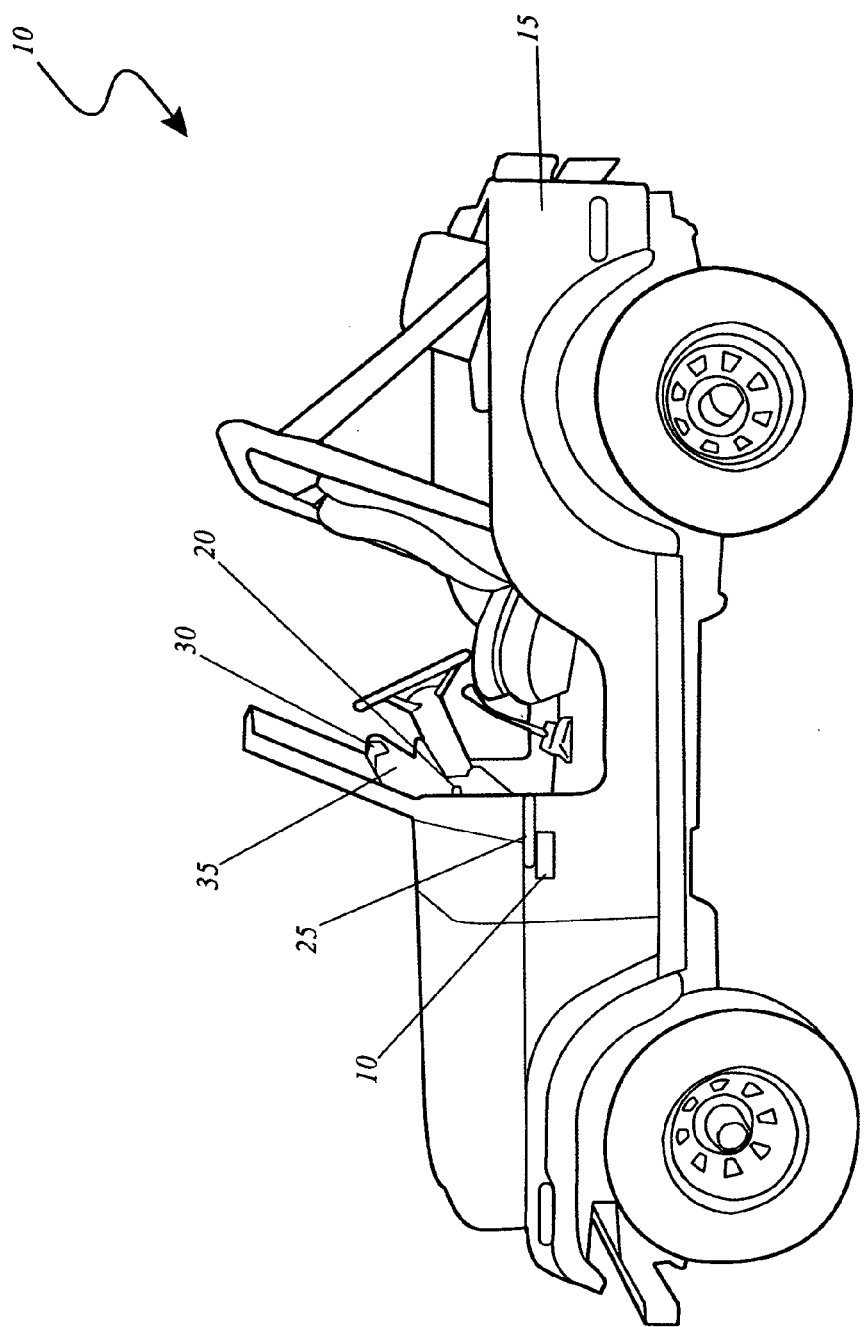
FIG. 1 is a pictorial representation of the motor vehicle function override apparatus 10 shown in a utilized state on a motor vehicle 15, according to the preferred embodiment of the present invention.

Descriptive Key
10 motor vehicle function override apparatus
15 motor vehicle
20 door switch
25 vehicle fuse box
30 remote switch
35 dash area
40 enclosure
45 fuse connection plug
50 local bypass switch
55 remote switch jack
60 main fuse
65 main fuse plug
70 internal overcurrent protective device

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Referring now to FIG. 1, a pictorial representation of the motor vehicle function override apparatus 10 shown in a utilized state on a motor vehicle 15, according to the preferred embodiment of the present invention is disclosed. The motor vehicle 15 is depicted as a Jeep Wrangler®, for purposes of illustration and illustration of functionality. The Jeep Wrangler's® utility and convenience in hauling items coupled with the ability of the vehicle to get into and out of off road locations have made them a popular alternative to other vehicles. Another attractive feature of said vehicle is the ability to remove the driver's and/or passenger's door during off-road and/or summertime driving, here shown in a removed state for illustrative purposes. However, when the subject doors are removed, the interior vehicle lights, or dome lights, remain on at all times due to a door switch 20 activated.

The door switch 20 is of the conventional type that closes an electric circuit allowing electrons to flow and to illuminate the light. Thus, the user is typically forced to remove a corresponding fuse from a vehicle fuse box 25 to remove electrical power from the interior light circuit. While this method works, it is very inconvenient, and places repeated stress and strain on the vehicle fuse box over time. To compensate for said difficulties, the motor vehicle function override apparatus 10 is located at the vehicle fuse box 25 to provide override and control functionality for the interior light circuit.

The existing fuse for the dome light circuit is removed and the motor vehicle function override apparatus 10 is installed in its place, as will be described in greater detail herein below. Additionally, the motor vehicle function override apparatus 10 provides for a remote switch 30 located up on the dash area 35 of the motor vehicle 15 or other equally accessible location. Thus, when one or both vehicle doors are removed, the user is provided with an accessible, functional and easily reversible means of deactivating the interior or dome lights. It should be noted that while the motor vehicle function override apparatus 10 is specifically envisioned as being a means to control interior dome light circuits, other electrical circuits on all types of vehicles can be controlled in an equal manner by the motor vehicle function override apparatus 10. This electrical equipment is envisioned to include other lighting circuits, radio circuits, safety circuits and the like. As such, the functionality of the motor vehicle function override apparatus 10 with only interior dome light circuits should not be interpreted as a limiting factor of the present invention.

Figure 2:
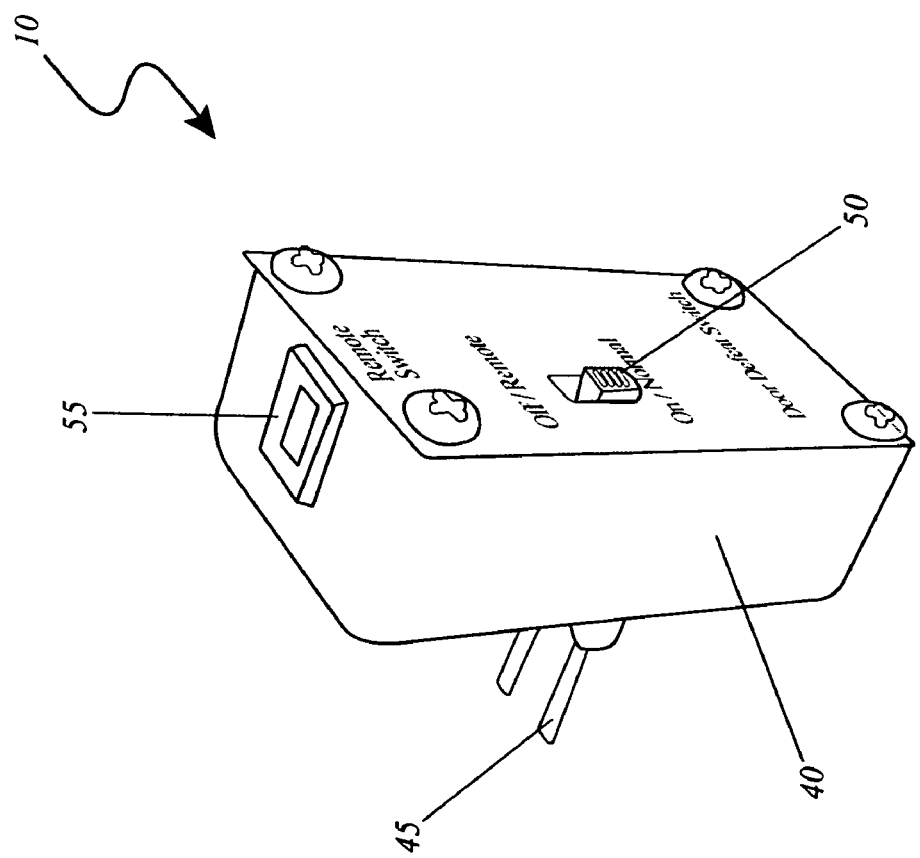
FIG. 2 is an isometric view of the motor vehicle function override apparatus 10.

Referring next to FIG. 2, an isometric view of the motor vehicle function override apparatus 10 is shown. This figure more clearly shows the features of the motor vehicle function override apparatus 10. The motor vehicle function override apparatus 10 is housed in a small plastic enclosure 40 as shown. It is envisioned that the enclosure 40 would be limited in size to approximately 1-½ inches square and one (1) inch thick to allow the enclosure 40 to fit within the tight confines of the typical vehicle fuse box 25 (as shown in FIG. 1). A fuse connection plug 45 is located on the rear of the enclosure 40 which connects to the space made available by the removed factory supplied fuse in the vehicle fuse box 25 (as shown in FIG. 1).

Said fuse connection plug 45 forms the mechanical supporting means for the motor vehicle function override apparatus 10 as well. The fuse connection plug 45 is depicted as a plug which would mimic the ATO style fuse connection typically found in many motor vehicles. However, other types of fuse plugs such as the SFE style, the GBC style, circuit breakers, fusible links and the like could be used equally as well, and as such, should not be interpreted as a limiting factor of the present invention. A local bypass switch 50 is provided on the face of the enclosure 40 and allows the user to activate the invention in an easy manner.

In its ON/NORMAL position, the local bypass switch 50 serves to keep a fuse in the lighting circuit, and as such, allows the interior dome light to function in its normal manner. When the local bypass switch 50 is placed in an OFF/BYPASS position, the factory-supplied fuse is effectively removed from the interior dome light circuit, and prevents the dome light from illuminating, should the vehicle doors be opened or removed. Located atop the enclosure 40 is a remote switch jack 55. The remote switch jack 55 is envisioned to be a captive type automotive connector commonly used in an automotive environment that can carry the electrical current necessary that is usually present on the interior dome light circuit envisioned to be no more than 10 amps. However, any type of power connector can be used, and as such, should not be interpreted as a limiting factor of the present invention.

Figure 3:
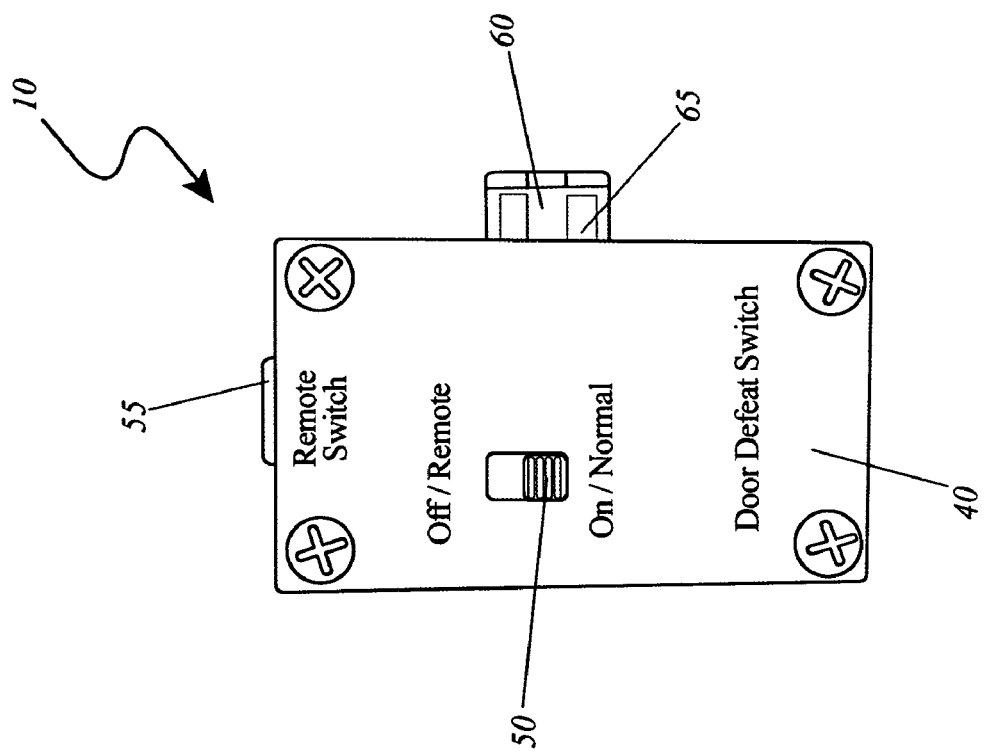
FIG. 3 is a front view of the motor vehicle function override apparatus 10; and, FIG. 4 is an electrical schematic diagram depicting the electrical components as used with the motor vehicle function override apparatus 10.

Referring now to FIG. 3, a front view of the motor vehicle function override apparatus 10 is depicted. This figure also depicts the local bypass switch 50 and the remote switch jack 55. Located on the left side of the enclosure 40 is a main fuse 60. The main fuse 60 is envisioned to be the same fuse that is removed from the vehicle fuse box 25 (as shown in FIG. 1) to allow for the insertion of the motor vehicle function override apparatus 10 via its associated fuse connection plug 45 (as shown in FIG. 2), although any fuse can be used, and as such, should not be interpreted as a limiting factor of the present invention. The main fuse 60 is connected into a main fuse plug 65, provided as part of the motor vehicle function override apparatus 10. The main fuse plug 65 would be of the same type and style as provided by the fuse connection plug 45 (as shown in FIG. 2) such as an ATO style, a SFE style, a GBC style, or the like. The main fuse 60 is switched in and out of the interior dome light circuit by the motor vehicle function override apparatus 10.

Figure 4:
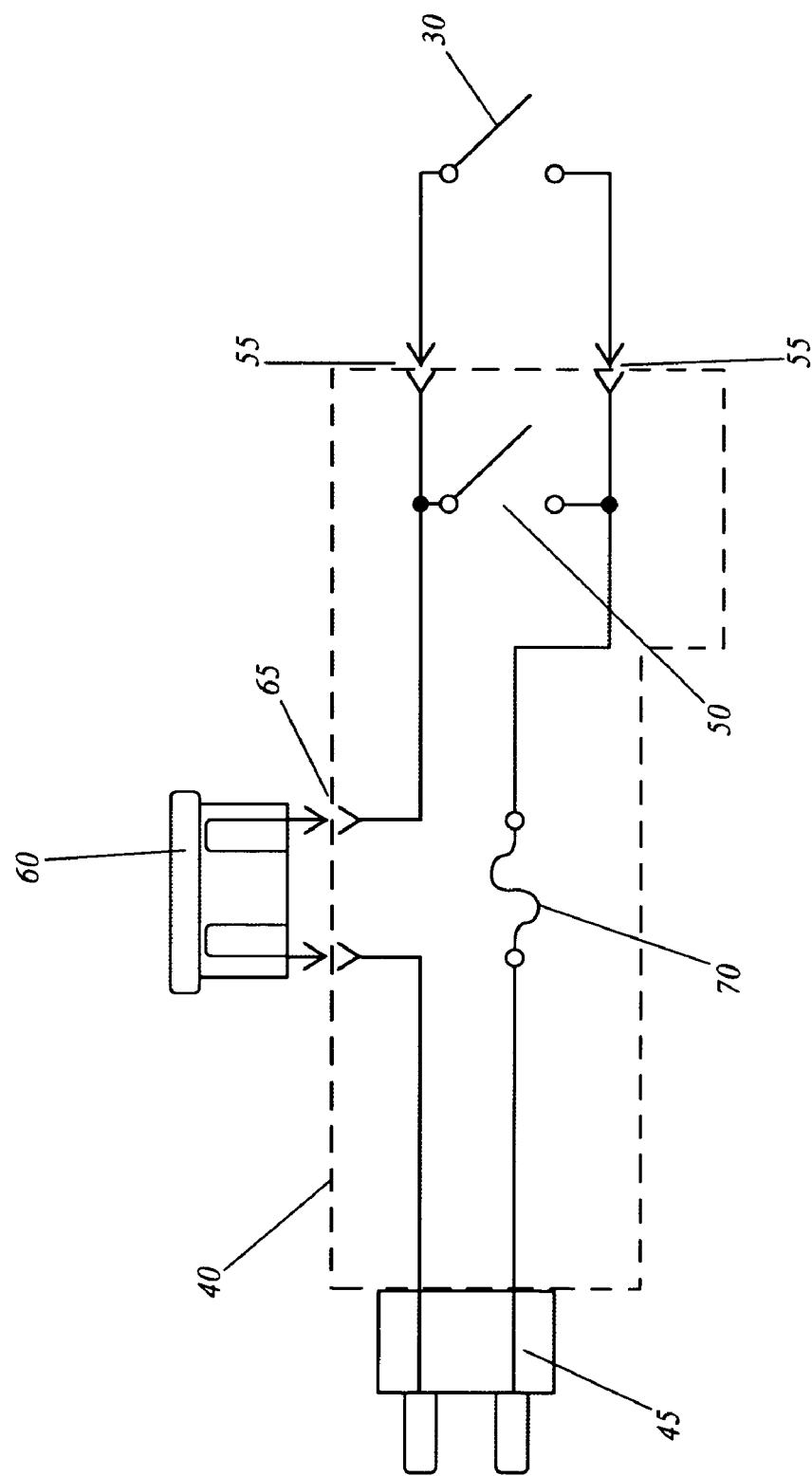

Referring finally to FIG. 4, an electrical schematic diagram depicting the electrical components as used with the motor vehicle function override apparatus 10 is shown. The only connection to the electrical system of the motor vehicle 15 is via the fuse connection plug 45. Since the "hot" or line side of the connection can vary from vehicle to vehicle model, and since it cannot be assured that the "hot" or line side is directly routed through the main fuse 60, an internal overcurrent protective device 70 is provided internally to the enclosure 40 (as shown in FIG. 2). Thus, no matter which polarity as afforded by the fuse connection plug 45 is selected, the components of the motor vehicle function override apparatus 10 as well as any external wiring as connected to the remote switch jack 55, is protected against overcurrent conditions by the main fuse 60, or internal overcurrent protective device 70.

The internal overcurrent protective device 70 may be a fuse, a circuit breaker or a similar apparatus. The local bypass switch 50 is wired in a series fashion with the fuse connection plug 45, the main fuse 60, and the internal overcurrent protective device 70, thus effectively removing both the main fuse 60 and the internal overcurrent protective device 70 when opened. The remote switch 30 is wired in a parallel fashion to the local bypass switch 50 using the remote switch jack 55. In this manner, the user can leave the local bypass switch 50 in its open position, and decide whether or not to activate the motor vehicle function override apparatus 10 by using the remote switch 30 located on the dash area 35 (as shown in FIG. 1).

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. To utilize the motor vehicle function override apparatus 10 to control the dome lights of a motor vehicle 15 such as a Jeep®, or any electrical circuit on any motor vehicle 15, the user would first remove the main fuse 60, from the associated circuit in the vehicle fuse box 25. Next, the main fuse 60 would be placed in the main fuse plug 65 on the motor vehicle function override apparatus 10, and the motor vehicle function override apparatus 10 would be connected to the previously abandoned connection point using the fuse connection plug 45 on the rear of the enclosure 40. At this point, the installation of the motor vehicle function override apparatus 10 is complete.

To utilize the circuit in its original, or as supplied configuration, the user would close the local bypass switch 50. To deactivate the dome light or any associated circuit, the user would open the local bypass switch 50. Said deactivation is envisioned as being quicker and easier than other more commonly used methods. Additionally, with the local bypass switch 50 open and the remote switch 30 in place on the dash area 35 on the motor vehicle 15, the user can duplicate the aforementioned electrical control of the dome light or associated circuit via the remote switch 30 as aforementioned described. Should the functionality of the motor vehicle function override apparatus 10 be no longer needed or required, the user can remove the motor vehicle function override apparatus 10 from the vehicle fuse box 25, remove the main fuse 60 from the main fuse plug 65 and place the main fuse 60 in the vacated spot in the vehicle fuse box 25 with no permanent modifications required.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A vehicle electrical control system for bypassing an existing vehicle fuse box when at least one door of the vehicle has been detached therefrom, said vehicle electrical control system comprising:
    a portable enclosure removably coupled to the existing vehicle fuse box; and,
    means for toggling a plurality of electrically actuated circuits between operating and non-operating modes while at least one vehicle door is detached from the vehicle, said circuit toggling means being housed within said enclosure and further being electrically coupled to the existing vehicle fuse box;
    wherein the existing vehicle fuse box is electrically connected to said electrically actuated circuits when said circuit toggling means is adapted to an on position such that at least one of said electrically actuated circuits remains functional when the at least one vehicle door is detached from the vehicle;
    wherein the existing vehicle fuse box is electrically disconnected from said electrically actuated circuits when said circuit toggling means is adapted to an off position such that at least one of said electrically actuated circuits remains non-functional when the at least one vehicle door is detached from the vehicle.

2. The vehicle electrical control system of claim 1, wherein said circuit toggling means comprises:
    a fuse connection plug electrically coupled to the existing vehicle fuse box;
    a local bypass switch operably coupled to said fuse connection plug; and,
    a remote switch jack for carrying an electrical current to said at least one electrically actuated circuits.

3. The vehicle electrical control system of claim 2, wherein said circuit toggling means further comprises:
    a main fuse electrically connected directly to said main fuse plug; and,
    an internal overcurrent protective device electrically coupled to said fuse connection plug and said remote switch jack for protecting said circuit toggling means from overcurrent conditions caused by said main fuse.

4. The vehicle electrical control system of claim 3, wherein said internal overcurrent protective device comprises:
    one component selected from the group including a fuse and a circuit breaker respectively.

5. The vehicle electrical control system of claim 2, wherein said local bypass switch is electrically wired in series with said fuse connection plug and said main fuse and said internal overcurrent protective device respectively for bypassing both of said main fuse and said internal overcurrent protective device when said local bypass switch is toggled to the off position.

6. The vehicle electrical control system of claim 5, further comprising:
    a remote switch electrically wired in parallel to said local bypass switch, said remote switch further being in direct electrical communication to said remote switch jack such that said vehicle electrical control system is selectively adaptable between active and inactive modes while said local bypass switch remains in the open position.

7. A vehicle electrical control system for bypassing an existing vehicle fuse box when at least one door of the vehicle has been detached therefrom, said vehicle electrical control system comprising:
    a portable enclosure removably coupled to the existing vehicle fuse box, wherein said enclosure has a general square shape provided with approximately a 1.5 inch width and one inch thickness for allowing said enclosure to fit within space limited areas of the existing fuse box; and,
    means for toggling a plurality of electrically actuated circuits between operating and non-operating modes while at least one vehicle door is detached from the vehicle, said circuit toggling means being housed within said enclosure and further being electrically coupled to the existing vehicle fuse box;
    wherein the existing vehicle fuse box is electrically connected to said electrically actuated circuits when said circuit toggling means is adapted to an on position such that at least one of said electrically actuated circuits remains functional when the at least one vehicle door is detached from the vehicle;
    wherein the existing vehicle fuse box is electrically disconnected from said electrically actuated circuits when said circuit toggling means is adapted to an off position such that at least one of said electrically actuated circuits remains non-functional when the at least one vehicle door is detached from the vehicle.

8. The vehicle electrical control system of claim 7, wherein said circuit toggling means comprises:
    a fuse connection plug electrically coupled to the existing vehicle fuse box;
    a local bypass switch operably coupled to said fuse connection plug; and,
    a remote switch jack for carrying an electrical current to said at least one electrically actuated circuits.

9. The vehicle electrical control system of claim 8, wherein said circuit toggling means further comprises:
    a main fuse electrically connected directly to said main fuse plug; and,
    an internal overcurrent protective device electrically coupled to said fuse connection plug and said remote switch jack for protecting said circuit toggling means from overcurrent conditions caused by said main fuse.

10. The vehicle electrical control system of claim 9, wherein said internal overcurrent protective device comprises:
    one component selected from the group including a fuse and a circuit breaker respectively.

11. The vehicle electrical control system of claim 8, wherein said local bypass switch is electrically wired in series with said fuse connection plug and said main fuse and said internal overcurrent protective device respectively for bypassing both of said main fuse and said internal overcurrent protective device when said local bypass switch is toggled to the off position.

12. The vehicle electrical control system of claim 11, further comprising:
   a remote switch electrically wired in parallel to said local bypass switch, said remote switch further being in direct electrical communication to said remote switch jack such that said vehicle electrical control system is selectively adaptable between active and inactive modes while said local bypass switch remains in the open position.

13. A method for overriding an existing vehicle fuse box such that an operator can deactivate at least one electrically actuated vehicle circuit after at least one door of the vehicle has been detached therefrom, said method including the steps of:
   a. providing an enclosure suitably sized and shaped for fitting adjacent to an existing vehicle fuse box;
   b. removing a main fuse from a target circuit of the existing vehicle fuse box;
   c. connecting said main fuse to a main fuse plug located on said enclosure;
   d. connecting a fuse connection plug to a previously abandoned connection point of the existing vehicle fuse box;
   e. closing a local bypass switch of said enclosure; and,
   f. deactivating said interior vehicle lights by toggling said local bypass switch to an open position.

14. The method of claim 13, wherein step f. is manually performed by the operator.

15. The method of claim 13, wherein step f. is remotely actuated by a remote switch in wireless communication with said local bypass switch.

16. The method of claim 13, further comprising the steps of:
   g. toggling said local bypass switch to the off position; and,
   h. removing said enclosure from the existing vehicle fuse box.

17. The method of claim 16, wherein step h. comprises:
   i. removing said main fuse from said main fuse plug; and,
   j. reconnecting said main fuse to the previously abandoned connection point of the existing vehicle fuse box.

* * * * *